L. A. THORNBURG.
GLASS DRAWING APPARATUS.
APPLICATION FILED NOV. 12, 1913.

1,183,697.

Patented May 16, 1916.
2 SHEETS—SHEET 1.

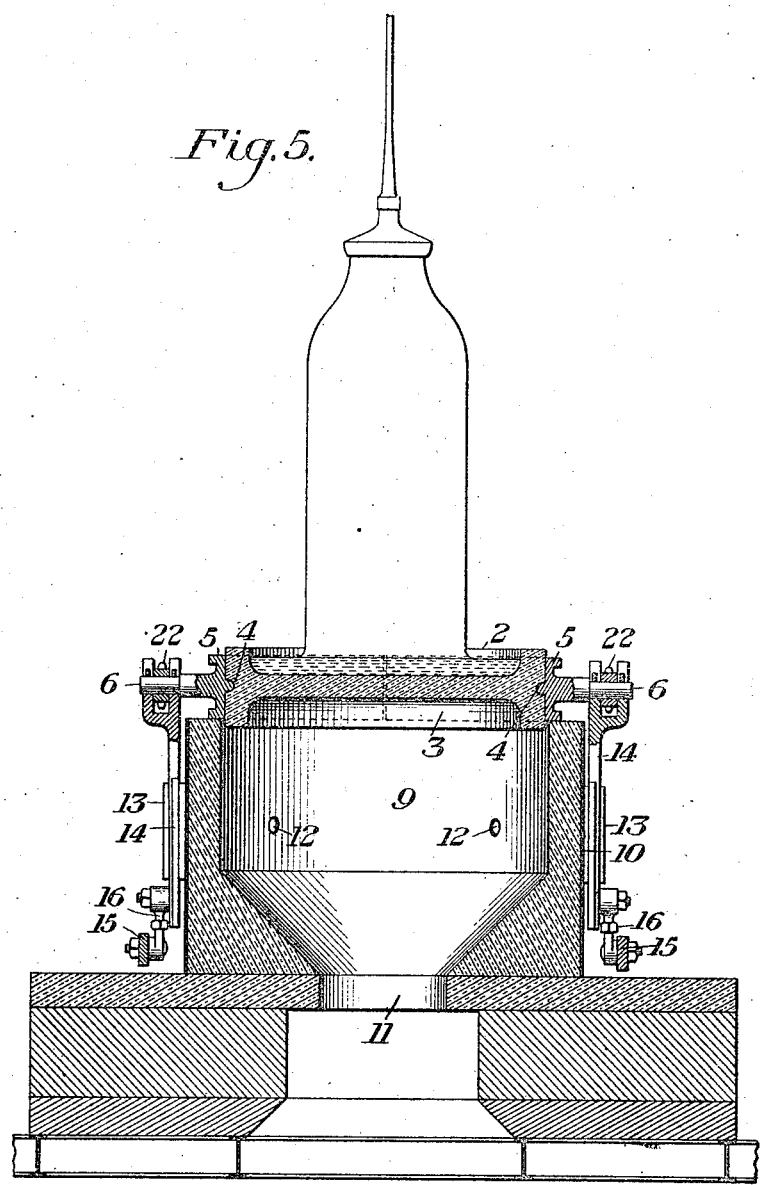

UNITED STATES PATENT OFFICE.

LINCOLN A. THORNBURG, OF MUNCIE, INDIANA, ASSIGNOR TO WINDOW GLASS MACHINE COMPANY, OF PITTSBURGH, PENNSYLVANIA, A CORPORATION OF NEW JERSEY.

GLASS-DRAWING APPARATUS.

1,183,697.  Specification of Letters Patent.  Patented May 16, 1916.

Application filed November 12, 1913. Serial No. 800,530.

*To all whom it may concern:*

Be it known that I, LINCOLN A. THORNBURG, a citizen of the United States, residing at Muncie, Delaware county, Indiana, have invented a new and useful Improvement in Glass-Drawing Apparatus, of which the following is a full, clear, and exact description, reference being had to the accompanying drawings, forming part of this specification, in which—

Figure 1:
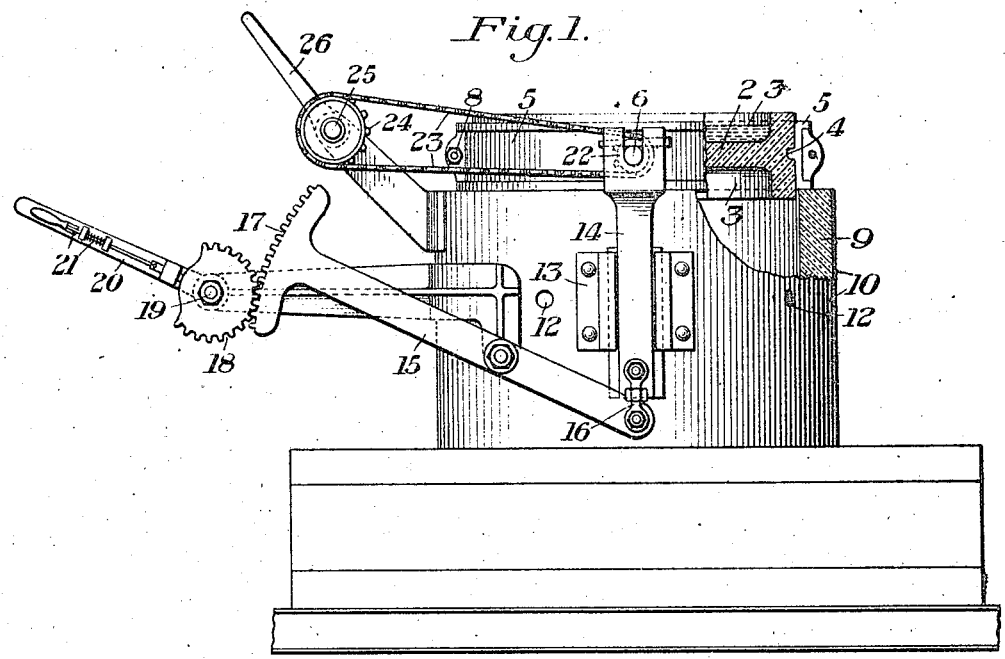
Figure 2:
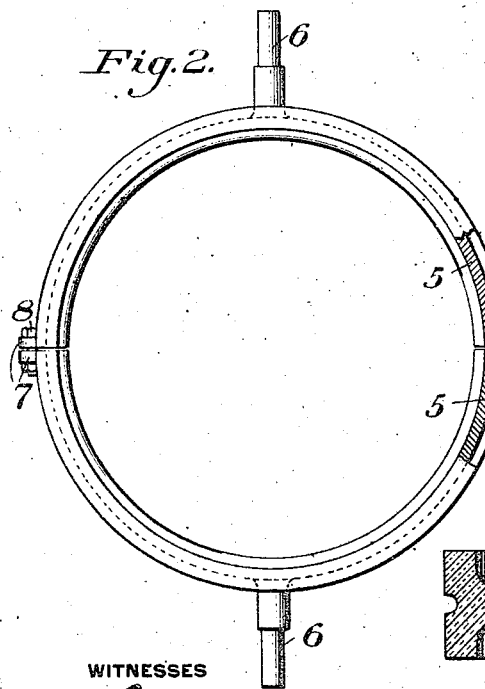
Figure 3:
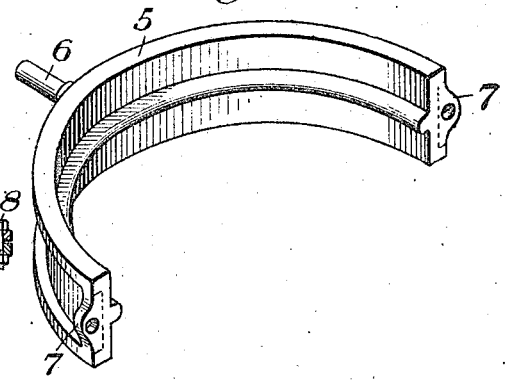
Figure 4:
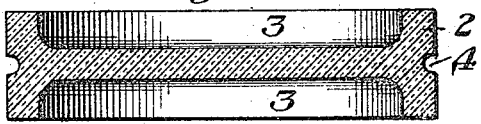

Figure 1 is a side elevation, partly in section, showing one form of glass-drawing apparatus constructed in accordance with my invention; Fig. 2 is a plan view of the clamping ring, partly in section; Fig. 3 is a perspective view showing one-half of the clamping ring with its trunnion; Fig. 4 is a central sectional view of the pot; and Fig. 5 is a central sectional view of the pot-furnace with the pot in place, it being taken at right angles to Fig. 1.

My invention relates to the drawing of glass from pots or receptacles into which molten glass is fed, and particularly to the type of reversible pot shown in my United States Patent No. 759,329, dated May 10, 1904, for glass-drawing apparatus. In the furnace of said prior patent the refractory pot was molded with integral trunnions which projected through the slots in the sides of the furnace walls. A top-stone was used for the furnace, and the pot was lowered before turning.

In the present invention, the refractory pot, which is preferably a double reversible one, is formed without trunnions and is supported within a metal ring, preferably a two-part clamping ring, which is provided with trunnions. These trunnions are preferably located above the top of the furnace so that no slots are needed in the furnace walls, thus simplifying and cheapening the construction.

In the drawings, 2 represents the turning-pot which I have shown as of double reversible form having opposite cavities 3, 3 to receive successive portions of molten glass. This pot is preferably formed with a circumferential recess 4 to receive a corresponding annular projection on a clamping ring, which is preferably formed of a plurality of parts. In the form shown it consists of two parts 5, 5, formed preferably of cast-iron, each part having a trunnion 6. The meeting end portions of the two castings are preferably flanged as shown at 7, these flanges being perforated to receive bolts 8 by which the clamping ring is secured in place around the pot. The engagement between the pot and ring may, of course, be of any desired form, instead of the tongue-and-groove shown, or the ring may be merely a plain ring made in parts and drawn tightly together around the pot.

The furnace 9 is preferably in the form of a refractory cylinder with an outer casing 10 of steel or iron, and of a proper size to fit about the lower portion of the pot when in position, as shown in Figs. 1 and 5. The walls are preferably of inverted frusto-conical shape in their lower portions to direct the glass downwardly through the hole or eye 11 as it is melted out of the lower cavity. For this melting I preferably employ gas burners which preferably project through the burner openings 12 in the side walls of the furnace and may be directed upwardly toward the pot cavity or not as desired.

To lift and turn the pot I employ mechanism of the same general construction as shown in my patent above referred to, but the guides 13 for the sliding supports 14, carrying the trunnion bearings, are preferably directly connected to the casing of the furnace, thus avoiding the considerable overhang of my prior patent. To lift the pot I connect the levers 15 with the supports 14 through adjustable, swinging links 16. The levers are pivoted on opposite sides of the furnace and their outer ends are provided with segmental racks 17 engaging toothed wheels 18 secured to a shaft 19 having operating handle 20, which is preferably provided with the locking-dog mechanism 21, as in my prior patent. To turn the pot, I show sprocket wheels 22, secured to its trunnions between the bearings, and over which extend sprocket chains 23 which engage sprocket wheels 24 on a shaft 25 having operating handle 26. When in position, the pot preferably hangs slightly within the wall of the furnace, and the iron clamping ring rests on the top of this cylinder wall, as shown in Figs. 1 and 5.

In using the apparatus, the pot rests in the position as shown in Fig. 5, and the glass cylinder or other article is drawn from the glass bath in the top cavity. At the same time, the waste glass from the previous draw is being melted out of the bottom cavity, the heat also serving to heat the glass in the upper cavity. When the drawing is completed from the upper cavity, the pot is lifted, turned over, and dropped back into position, a fresh batch of molten glass is fed into the upper cavity and the operations repeated.

The advantages of my invention result from the use of the clamping ring, which preferably carries the trunnions. This makes the manufacture of the pot cheaper, easier and more economical. The difficulty of forming trunnions on the pot is avoided and the apparatus simplified. Furthermore, by setting the pot above the top-stone, the glass in the bath is cooled more rapidly, thus increasing the production by increasing the drawing speed of the machine. With cooler glass, the drawing may be performed more rapidly, while with hotter glass, it may proceed more slowly to set properly and give the desired thickness. Where the pot is inclosed in the furnace, the glass cools more slowly, and consequently, the drawing speed must be slower than in the present form. Also, by doing away with the top-stone, the furnace is made cheaper and easier to manufacture and may be made in the cylindrical form shown, to fit the circumference of the pot.

A pot with a single cavity may be used; the mechanism for raising and turning may be varied; the shape of the pot and furnace may be changed; other forms of clamping rings may be used; and other variations may be made without departing from my invention.

I claim:

1. A glass-drawing pot, comprising a refractory pot body having opposite pot cavities therein separated by a common bottom wall, and a metal carrier ring having trunnions and embracing said body, said ring surrounding and reinforcing the rim walls of both pot cavities, at opposite sides of the common bottom wall, substantially as described.

2. A glass-drawing apparatus, comprising a pot furnace, a refractory pot body having a pot cavity formed therein, a metallic ring embracing said body and having trunnions, the pot body being of less diameter than the top portion of the furnace whereby it will seat partially therein, and said ring normally resting on the furnace, said ring and its trunnion taking the entire weight of the pot, substantially as described.

3. A glass-drawing apparatus, comprising a reversible pot body having pot cavities formed in opposite sides thereof, and a metallic ring embracing the exterior of said body and having trunnions, in combination with a heating furnace over which the pot is supported on said trunnions, the pot being of a diameter relative to the diameter of the top opening of the furnace to fit partially within said opening in both of the reversed positions, said ring normally resting on the top of the furnace, and the pot body being itself free of any supporting engagement with the wall of the furnace, substantially as described.

In testimony whereof, I have hereunto set my hand.

LINCOLN A. X THORNBURG.
his mark

Witnesses:
    John F. Meredith,
    Clara E. Thornburg.